United States Patent
Brockschmidt et al.

(10) Patent No.: US 9,543,800 B2
(45) Date of Patent: Jan. 10, 2017

(54) EXTERNAL CORONA SHIELDING FOR AN ELECTRICAL MACHINE

(71) Applicant: SIEMENS AKTIENGESELLSCHAFT, München (DE)

(72) Inventors: Mario Brockschmidt, Essen (DE); Stefan Kempen, Arnsberg (DE); Friedhelm Pholmann, Essen (DE); Guido Schmidt, Leichlingen (DE); Christian Staubach, Marl (DE)

(73) Assignee: SIEMENS AKTIENGESELLSCHAFT (DE)

( * ) Notice: Subject to any disclaimer, the term of this patent is extended or adjusted under 35 U.S.C. 154(b) by 452 days.

(21) Appl. No.: 14/351,985

(22) PCT Filed: Sep. 26, 2012

(86) PCT No.: PCT/EP2012/068913
§ 371 (c)(1),
(2) Date: Apr. 15, 2014

(87) PCT Pub. No.: WO2013/060544
PCT Pub. Date: May 2, 2013

(65) Prior Publication Data
US 2014/0246941 A1   Sep. 4, 2014

(30) Foreign Application Priority Data
Oct. 26, 2011   (EP) .................................... 11186755

(51) Int. Cl.
*H02K 3/40* (2006.01)

(52) U.S. Cl.
CPC ........................................ *H02K 3/40* (2013.01)

(58) Field of Classification Search
CPC ............... H02K 3/32; H02K 3/38; H02K 3/40
(Continued)

(56) References Cited

U.S. PATENT DOCUMENTS

| | | | |
|---|---|---|---|
| 6,130,495 A | | 10/2000 | Schulten et al. ............... 310/196 |
| 6,130,496 A | * | 10/2000 | Takigawa ................. H02K 3/40 310/196 |

(Continued)

FOREIGN PATENT DOCUMENTS

| | | | | |
|---|---|---|---|---|
| CA | 2309284 | * | 6/1999 | ............... H02K 3/40 |
| DE | 19547299 | * | 6/1997 | ............... H02K 3/40 |

(Continued)

OTHER PUBLICATIONS

International Preliminary Report on Patentability dated Jan. 27, 2014 issued in corresponding International patent application No. PCT/EP2012/068913.
(Continued)

*Primary Examiner* — Burton Mullins
(74) *Attorney, Agent, or Firm* — Ostrolenk Faber LLP

(57) ABSTRACT

An external corona shielding for a conductor bar of an electric machine, a main insulating layer sheath on the conductor bar. The shielding has a first ply, which sheaths the main insulating layer, and a second ply, which sheaths the first ply. Each ply is a conductive, impregnatable layer with a sliding layer, wherein the sliding layers of the two plies (20, 21) face one another. Each sliding layer has at least one cutout, wherein the two conductive layers are connected to one another through these cutouts with the aid of a permanently elastic, electrically conductive connection.

11 Claims, 1 Drawing Sheet

(58) Field of Classification Search
USPC ............. 310/196; 174/102 SC, 106 SC, 73.1
See application file for complete search history.

(56) References Cited

U.S. PATENT DOCUMENTS

| | | | | |
|---|---|---|---|---|
| 6,140,733 | A | * | 10/2000 | Wedde .................. H02K 3/345 |
| | | | | 310/196 |
| 6,750,400 | B2 | | 6/2004 | Younsi et al. |
| 6,798,107 | B2 | | 9/2004 | Leijon |

FOREIGN PATENT DOCUMENTS

| | | |
|---|---|---|
| EA | 001097 B1 | 10/2000 |
| EP | 0 603 212 | 11/1995 |
| RU | 2 088 024 C1 | 8/1997 |
| RU | 2291542 C2 | 1/2007 |
| WO | WO 97/43817 A1 | 11/1997 |

OTHER PUBLICATIONS

Search Report dated Jul. 9, 2012 issued in corresponding European Patent Application No. 11186755.2.
Search Report dated Jul. 10, 2013 issued in corresponding International Patent Application No. PCT/EP2012/068913.
Decision on Grant dated Apr. 20, 2015 in corresponding Russian Patent Application No. 2014121044/07 (with English language translation)(12 pages).

* cited by examiner

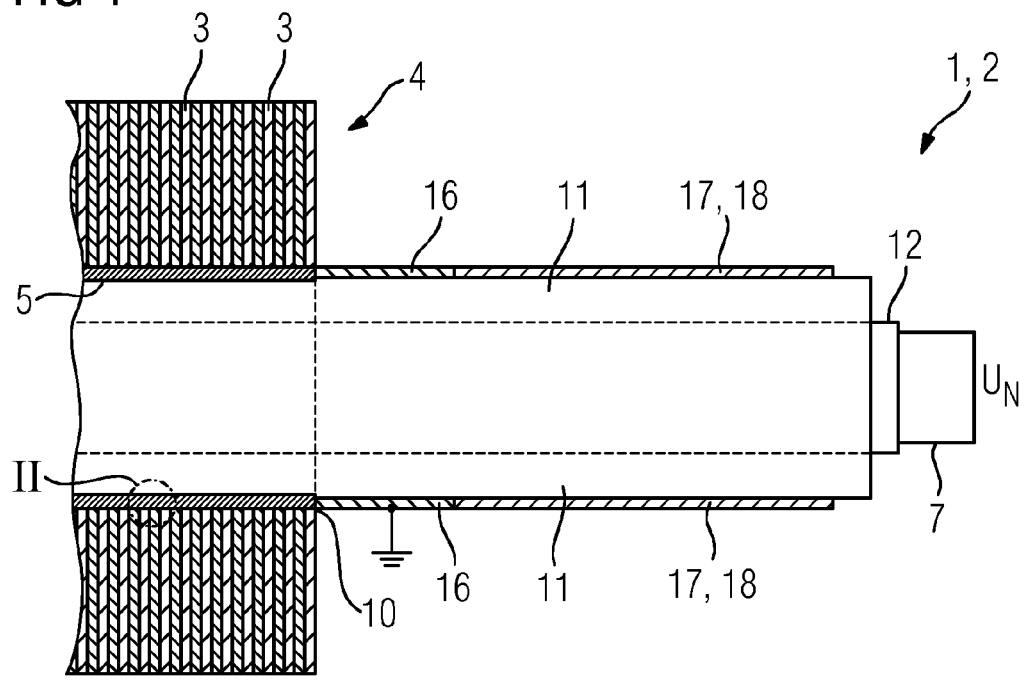
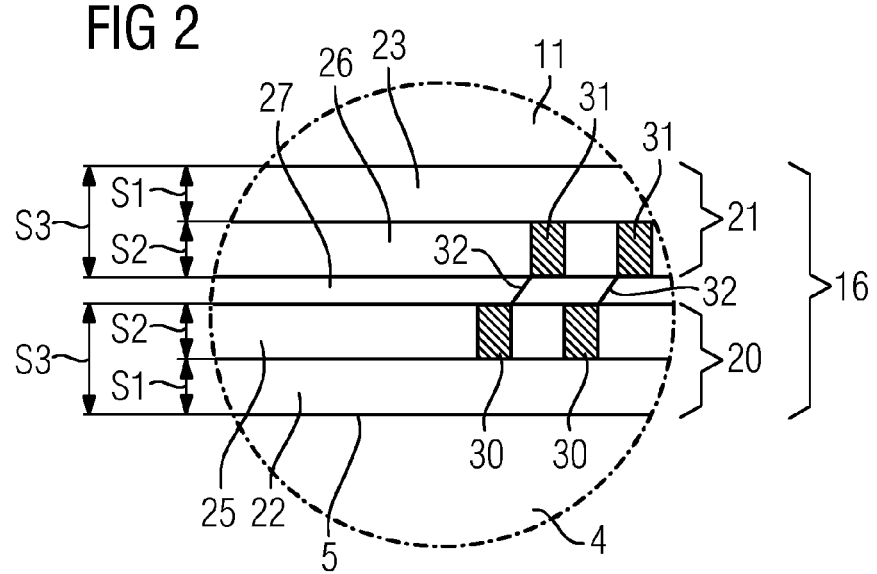

EXTERNAL CORONA SHIELDING FOR AN ELECTRICAL MACHINE

CROSS-REFERENCE TO RELATED APPLICATIONS

The present application is a 35 U.S.C. §§371 national phase conversion of PCT/EP2012/068913, filed Sep. 26, 2012, which claims priority of European Patent Application No. 11186755.2, filed Oct. 26, 2011, the contents of which are incorporated by reference herein. The PCT International Application was published in the German language.

The invention relates to an arrangement comprising a conductor bar of an electric machine, wherein the conductor bar is sheathed by a main insulating layer, and an external corona shielding. Furthermore, the invention relates to a corona shielding strip for producing the external corona shielding and to an electric machine comprising an arrangement of the above-described type.

The term "electric machine" is generally used to denote an energy transducer which converts between electrical and mechanical energy, namely an electric motor or a generator. Such an electric machine generally comprises a stationary stator and a rotating rotor. The electric machine is in particular a turbogenerator, which is used in a power station for converting mechanical energy into electrical energy.

A turbogenerator is at present usually realized in the form of a three-phase AC synchronous machine comprising a solid two-pole or four-pole rotor. The power range of such a turbogenerator typically reaches from approximately 20 MVA to approximately 2000 MVA.

The stator of a conventional synchronous generator comprises a multiplicity of so-called stator windings, in which an AC voltage is induced by inductive interaction with the rotating rotor, to which a constant current is applied. The stator windings are accommodated in a so-called laminate stack. This is used, inter alia, for guiding and intensifying the magnetic field. In order to reduce losses as a result of eddy currents, the entire laminate stack is constructed from thin laminations which are insulated from one another. The stator windings consist of a multiplicity of bars, whose respective central pieces (the so-called "active part") are inserted into slots in the laminate stack. The individual bars emerge from the slots in involute fashion at the so-called "end winding". There, the individual bars are interconnected to form the stator winding (i.e. contact is made between said individual bars).

The bars or bar regions lying in the laminate stack are at a high electrical potential and are therefore electrically insulated from one another and from the grounded laminate stack by a main insulating layer.

In order to avoid partial discharges at operating voltages of a few kilovolts (kV), the main insulating layer is generally shielded from cavities and detachments by an inner and an outer conducting layer. The inner conducting layer is referred to as "inner potential grading" (IPG) and is at the potential of the bar. The outer conducting layer is referred to as "external corona shielding" (ECS) and is at ground potential. The electrical potential in the main insulating layer is reduced starting from the IPG in a radial direction up to the ECS.

The external corona shielding has the central object of connecting the main insulation to the grounded laminate stack in such a way that, as far as possible, all of the high-voltage potential is reduced over the main insulating layer. In this case, the loading by the electrical field should be homogeneous, as far as possible, over the main insulating layer.

In order to produce the main insulating layer, the entire stator is impregnated in an impregnating resin in a conventional, so-called GVPI ("global vacuum pressure impregnation") method. By means of the impregnation of the stator, the conductor bar including the external corona shielding adheres with the adjoining laminate stack in the slot.

During operation of the generator, however, owing to different coefficients of thermal expansion of the laminate stack, the copper of the conductor bar and the main insulating layer, thermal and mechanical forces act on the conductor bar when the generator is ramped up and ramped down.

By virtue of such thermomechanical stresses in the interface region between the outer side of the main insulating layer and the laminate stack, in the case of a fixed mechanical connection, delamination of the external corona shielding can occur, which can result in the occurrence of partial discharges when electrical potential differences exist in the region of the defects. In order to eliminate this possibility, when producing generators by means of the GVPI method with a conventional configuration, provision is made for the external corona shielding to comprise two conductive layers, wherein a separating layer in the form of a cleaved mica strip is defined between the outer and inner ECS layer. In the event of mechanical loading, this separating layer breaks open as the desired breaking point, with the result that the conductor bar is provided with room for movement along the slot. The outer and inner ECS layer are electrically connected to one another by a conductive nonwoven contact strip which is interweaved on one side. Contact is therefore made with the insulation periodically with the width of the strips. Such an external corona shielding is known from EP 0 603 212 B1, for example. Disadvantageously, such an external corona shielding has a comparatively large layer thickness.

An arrangement in accordance with the prior art is known from WO 97/43817 A1. The external corona shielding disclosed therein is formed from two protective layers surrounding one another. Each protective layer is in this case provided with an adhesive surface and an antiadhesive surface. The protective layers are connected to the adjoining parts of the electric machine, namely the conductor bar or the stator laminate stack, by means of the respective adhesive surface. The protective layers adjoin one another with the respective antiadhesive surfaces, as a result of which the conductor bar can be withdrawn easily from the stator laminate stack in the event of repair work.

SUMMARY OF THE INVENTION

The object of the invention is to specify an external corona shielding for an electric machine which is particularly well suited to use in a stator which is fully impregnated after the GVPI method.

This object is achieved according to the invention. Accordingly, a double-layered external corona shielding for a conductor bar of an electric machine, which conductor bar is sheathed by a main insulating layer, is provided. The external corona shielding comprises a first ply, which sheaths the main insulating layer, and a second ply, which in turn sheaths the first ply. In a fitted state of a conductor bar provided with the external corona shielding, therefore, the first ply of the external corona shielding adjoins the main insulating layer, while the second ply of the external corona shielding adjoins the laminate stack.

Each of the two plies consists substantially of an electrically conductive, impregnatable layer, which is provided in each case with a sliding layer. In this case, the two plies are aligned with respect to one another in such a way that their respective sliding layers face one another. According to the invention, each of the sliding layers has in each case at least one cutout, but preferably a multiplicity of cutouts. The two conductive layers of the two plies are in this case mechanically and electrically conductively connected to one another through the or each cutout by means of in each case one permanently elastic (in particular viscoelastic) and electrically conductive connection.

In cross section, a conductor bar provided with the external corona shielding is therefore constructed in the following way, when viewed from the inside out in the radial direction. In the interior, there is the electrically conductive conductor bar, which is sheathed by the main insulating layer. This is adjoined by the conductive layer of the first ply of the external corona shielding, which is in turn followed by the sliding layer of this first ply. In turn adjacent to this there is the sliding layer of the second ply of the external corona shielding and, as the outer layer, the conductive layer of said second ply.

"Electrically conductive" is in this case in particular also understood to mean an electrically "semiconductive" or "poorly conductive" material, i.e. a material with a limited (i.e. finite) electrical square resistance, in particular approximately in a range of between 10 kΩ and 200 kΩ.

The "sliding layer" denotes a (solid) material layer having a low coefficient of sliding friction or static friction (in particular in the range of between approximately 0.01 and 0.09 units, in particular approximately 0.04 units), which units is not covered, or is only barely covered, by the impregnating resin to be used in the GVPI method and which therefore does not enter into a cohesive connection (capable of holding) with the cured impregnating resin. The sliding layer is in particular a hydrophobic material.

Owing to the sliding layers facing one another, the two plies of the external corona shielding are not connected to one another by the impregnating resin, or are only weakly connected to one another in a manner which can be overcome without resulting in destruction. Therefore, the plies can slide one on the other to a certain extent so as to compensate for thermomechanical stresses, as a result of which damage to the plies is avoided. The or each elastic and conductive connection in this case, even in the event of a relative shift in the plies with respect to one another, ensures defined electrical contact between the plies.

As a result, advantageously a desired breaking layer between the plies can be dispensed with, as a result of which the external corona shielding according to the invention can be constructed with a particularly small layer thickness.

Advantageously, owing to the external corona shielding according to the invention, firstly the required mechanical decoupling of the two plies is realized, but secondly the equally required electrical connection between the plies is ensured. In addition, through-impregnation of the main insulating layer is favored.

The elastic and conductive connection is realized by an adhesive joint, which is expediently produced by an electrically conductive adhesive, in particular by an electrically conductive silicone or an electrically conductive epoxy adhesive. A suitable adhesive is marketed, for example, under the trade name "Loctite 3880".

The conductive layer is preferably formed by an impregnatable strip which is in turn manufactured in particular from a nonwoven material, preferably from a woven material.

In an expedient configuration, the or each sliding layer is produced from polytetrafluoroethylene (PTFE, marketed under the trade name "Teflon", for example).

In an embodiment which is preferred in terms of manufacturing, the or each cutout is produced by an etching operation. The cutouts are therefore preferably formed by points which are etched free in the sliding layer.

Given preferred dimensions, the external corona shielding (i.e. the two plies together) has a total thickness of approximately 0.3 mm.

The corona shielding strip according to the invention for producing an external corona shielding in accordance with one of the abovementioned embodiments comprises a first ply, and a second ply which rests flat on the first ply, wherein each of the plies comprises in each case a conductive, impregnatable layer, which is provided in each case with a sliding layer. In this case, the sliding layers of the two plies face one another. Each of the sliding layers has in each case at least one cutout, preferably a multiplicity of cutouts, wherein the two conductive layers are mechanically and electrically conductively connected to one another through these cutouts with the aid of a permanently elastic and conductive connection.

Given preferred dimensions, the corona shielding strip has a width of approximately 2 cm to 3.5 cm.

The electric machine according to the invention comprises at least one conductor bar which is sheathed by a main insulating layer, wherein the main insulating layer is in turn sheathed by an external corona shielding as described above. In this case, the external corona shielding in a particularly preferred embodiment is produced by winding the above-described corona shielding strip around the conductor bar. The winding of the conductor bar can in this case firstly be performed with a certain degree of overlap. Preferably, however, provision is made for the corona shielding strip to be wound "edge to edge" around the conductor bar, i.e. for the individual wraps not to overlap one another.

This variant is characterized by a particularly simple application of the external corona shielding since the number of production steps is reduced in comparison with a conventional, double-layered external corona shielding as described at the outset.

BRIEF DESCRIPTION OF THE DRAWINGS

An exemplary embodiment of the invention will be explained in more detail below with reference to a drawing, in which:

FIG. 1 shows a roughly schematically simplified illustration of a detail of an electric machine comprising a conductor bar which is sheathed by a main insulating layer and which forms part of a stator winding, wherein the main insulating layer is provided with a double-layered external corona shielding, and FIG. 2 shows an enlarged detail from FIG. 1 of the double-layered external corona shielding.

DESCRIPTION OF AN EMBODIMENT

Mutually corresponding parts and variables have the same reference symbols in all of the Figures.

FIG. 1 shows, in a very simplified illustration, a detail of an electric machine 1, in this case an AC turbogenerator. The machine 1 comprises a stator 2, in which a rotor (not explicitly illustrated) is mounted rotatably.

The stator 2 comprises a (stator) laminate stack 4 formed from a multiplicity of lamination plates 3 which are arranged next to one another in a row and are insulated from one another. In a manner known per se, a plurality of continuous (longitudinal) slots 5 is introduced into the laminate stack 4 transversely to the areal extent of the lamination plates 3, of which slots only one is illustrated in FIG. 1 for reasons of simplicity.

A conductor bar 7 rests in each slot 5. Each conductor bar 7 is in turn formed from a plurality of copper conductor elements which are insulated from one another and which are twisted with one another so as to form a so-called Roebel bar (in a manner not explicitly illustrated).

The conductor bar 7 protrudes out of the slot 5 at a slot outlet 10.

In order to insulate the conductor bar 7, to which a high electrical voltage UN is applied under operating conditions, from the grounded laminate stack 4, a glass filament/mica strip impregnated with a curable impregnating resin in a vacuum impregnation method (global vacuum pressure impregnation) is wound around said conductor bar circumferentially so as to form a main insulating layer 11.

In order to avoid the formation of potential peaks, and therefore to reduce the occurrence of partial discharges, the conductor bar 7 is provided with inner potential grading 12 formed by a conductive nonwoven material within the main insulating layer 11. In addition, the main insulating layer 11 is provided on the outside, at least within the laminate stack 4, with a double-layered external corona shielding 16. The external corona shielding 16 is continued slightly beyond the slot outlet 10, i.e. protrudes slightly out of the laminate stack 4.

In order to avoid the occurrence of a sliding arrangement, as an extension of the external corona shielding 16, an end corona shielding 17 is applied to the main insulating layer 11, which end corona shielding is formed by a semiconductive layer 18, whose surface resistance varies in locationally dependent fashion in the axial direction of the conductor bar 7.

FIG. 2 shows a detail II from FIG. 1 in enlarged form, which is used to explain schematically the construction of the double-layered external corona shielding 16.

The external corona shielding 16 comprises a first ply 20, which adjoins the laminate stack 4 at least in the subregion of the conductor bar 7, which is cast in the slot 5. In addition, the external corona shielding 16 comprises a second ply 21, which adjoins the main insulating layer 11. The first ply 20 and the second ply 21 are in this case formed identically. Each ply 20, 21 comprises a semiconductive layer, which is in this case formed from a woven material strip 22 and 23, respectively, which is impregnatable by means of the impregnating resin. The respective woven material strip 22 or 23 of the two plies 20 and 21 in this case consists of polyester or glass fibers, in each case.

In each of the plies 20, 21, the woven material strip 22, 23 is coated with a sliding layer, in this case with a Teflon coating 25 or 26 (illustrated with excess dimensions). In this case, the respective woven material strip 22, 23 has in each case a thickness S1 of approximately 20 to 100 µm, in particular approximately 40 µm, while the respective Teflon coating 25, 26 in each case has a thickness S2 of approximately 10 to 80 µm, in particular approximately 20 µm. The two plies 20, 21 have a total thickness S3 of approximately 0.3 mm.

As can be seen in FIG. 2, the two Teflon coatings 25, 26 of the first and second plies 20, 21, respectively, face one another, while the two woven material strips 22, 23 face away from one another. It is additionally indicated in FIG. 2 that each of the two plies 20, 21 of the external corona shielding 16 is connected fixedly to the laminate stack 4 or the main insulating layer 11 on one side, namely on the side of the respective woven material strip 22, 23 by means of the GVPI process. The Teflon coatings 25, 26, on the other hand, are barely covered or not covered at all with the impregnating resin in the GVPI process, as a result of which a gap 27 (again illustrated with excess dimensions) is formed between the two Teflon coatings 25, 26. As a result, the two plies 20, 21 are freely movable with respect to one another in the axial direction of the conductor bar 7 within a certain degree of play.

In each of the Teflon coatings 25, 26, in each case a multiplicity of cutouts 30 and 31, respectively, are etched free. In this case, in each case one cutout 30 in the first ply corresponds to a cutout 31 in the second ply 21 of the external corona shielding 16. For reasons of clarity, in each case only two cutouts 30, 31 are illustrated. An adhesive joint 32 consisting of a permanently viscoelastic, electrically conductive adhesive is produced in each case between two corresponding cutouts 30, 31, wherein in this case the adhesive used is "Loctite 3880". By means of these adhesive joints 32, the woven material strip 22 of the first ply 20 is electrically conductively connected to the woven material strip 23 of the second ply 21 of the external corona shielding 16, wherein this conductive connection remains, owing to the elasticity of the adhesive, even in the event of operationally dependent play between the two plies 20, 21.

The invention claimed is:

1. An arrangement for external corona shielding comprising:
    a conductor bar of an electric machine; a main insulating layer shielding the conductor bar;
    an external corona shielding for the conductive bar comprising a first ply which sheaths the main insulating layer and a second ply which sheaths the first ply;
    each of the first and second plies comprises a conductive, impregnatable layer provided with a respective sliding layer and the sliding layers on each of the two plies face one another; and
    each of the sliding layers has a plurality of cutouts, the two conductive layers are mechanically and electrically connected to one another through the cutouts by a permanently elastic, electrically conductive connection, wherein the elastic, electrically conductive connection is formed by an adhesive joint between the facing sliding layers.

2. The arrangement as claimed in claim 1, wherein the adhesive joint comprises a conductive adhesive.

3. The arrangement as claimed in claim 2, wherein the adhesive comprises an electrically conductive silicone or an electrically conductive epoxy adhesive.

4. The arrangement as claimed in claim 1, wherein each of the sliding layers has a large number of the cutouts;
    the two conductive layers are connected to one another through the cutouts by a large number of permanently elastic, electrically conductive connections.

5. The arrangement as claimed in claim 1, wherein at least one of the conductive layers comprises a strip fabricated from a woven material.

6. The arrangement as claimed in one of claim 1, wherein at least one of the sliding layers is fabricated from polytetrafluoroethylene.

7. The arrangement as claimed in one of claim 1, wherein at least one of the cutouts is produced by an etching operation.

8. The arrangement as claimed in one of claim 1, wherein the plies together have a total thickness of approximately 0.3 mm.

9. A corona shielding strip for producing the external corona shielding of an arrangement as claimed in claim 1, comprising:
   a first ply, and a second ply which rests flat on the first ply;
   each of the plies comprises a conductive, impregnatable layer;
   a sliding layer on each of the conductive impregnatable layers, wherein the sliding layers face one another;
   each of the sliding layers has at least one cutout and a permanently elastic, electrically conductive connection between the two conductive layers through the cutouts.

10. An electric machine comprising at least one arrangement as claimed in claim 1.

11. The electric machine as claimed in claim 10, wherein the external corona shielding comprises a corona shielding strip around the conductor bar, the shielding strip comprises:
   a first ply, and a second ply which rests flat on the first ply;
   each of the plies comprises a conductive, impregnatable layer;
   a sliding layer on each of the conductive impregnatable layers, wherein the sliding layers face one another;
   each of the sliding layers has at least one cutout and a permanently elastic, electrically conductive connection between the two conductive layers through the cutouts.

* * * * *